(12) United States Patent
Temerowski, II et al.

(10) Patent No.: US 11,048,955 B2
(45) Date of Patent: Jun. 29, 2021

(54) FIELD-PROGRAMMABLE GATE ARRAY-BASED BIOMETRIC SAMPLING SYSTEM FOR IMPROVING BIOMETRIC DATA REUSABILITY

(71) Applicant: AT&T Intellectual Property I, L.P., Atlanta, GA (US)

(72) Inventors: Gary Brian Temerowski, II, Flower Mound, TX (US); Joshua West, Austin, TX (US); Martin Patrick McEnroe, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 40 days.

(21) Appl. No.: 16/419,051

(22) Filed: May 22, 2019

(65) Prior Publication Data

US 2020/0372273 A1 Nov. 26, 2020

(51) Int. Cl.
*G06K 9/00* (2006.01)
*G06F 21/32* (2013.01)

(52) U.S. Cl.
CPC ......... *G06K 9/00926* (2013.01); *G06F 21/32* (2013.01)

(58) Field of Classification Search
CPC ........................... G06K 9/00926; G06F 21/32
See application file for complete search history.

(56) References Cited

U.S. PATENT DOCUMENTS

| | | | |
|---|---|---|---|
| 2007/0255941 A1* | 11/2007 | Ellis | H04L 9/0662 713/151 |
| 2017/0124313 A1* | 5/2017 | Mann | G10L 17/00 |
| 2018/0189466 A1* | 7/2018 | Raviv | G06N 3/0454 |
| 2020/0134145 A1* | 4/2020 | Bapst | G06F 21/45 |

* cited by examiner

*Primary Examiner* — Stephen G Sherman
(74) *Attorney, Agent, or Firm* — Hartman & Citrin LLC

(57) ABSTRACT

Concepts and technologies disclosed herein are directed to a field-programmable gate array ("FPGA")-based biometric sampling system for improving biometric data reusability. The system can include one or more FPGAs, each of which can include a plurality of configurable input/output ("I/O") blocks, a plurality of configurable logic blocks, and a plurality of configurable interconnects that connect the plurality of configurable I/O blocks to the plurality of configurable logic blocks. The FPGA(s) can be configured based upon a hardware description language model to receive biometric input data associated with a user, to apply a sampling scheme to the biometric input data to extract, from the biometric input data, an enrollment biometric data sample, and to cause the enrollment biometric data sample to be stored in a database.

18 Claims, 9 Drawing Sheets

FIELD-PROGRAMMABLE GATE ARRAY-BASED BIOMETRIC SAMPLING SYSTEM FOR IMPROVING BIOMETRIC DATA REUSABILITY

BACKGROUND

Biometrics, such as fingerprint recognition, face recognition, and iris recognition, are an excellent way to secure devices and systems and provide many advantages over traditional security mechanisms such as a user name and password. One advantage is it is difficult for a malicious actor to spoof biometric data. Biometric data, however, must be stored in some form on a device. It is common practice for the entirety of the biometric data to be stored in a secure memory. Even with the most recent security technologies, such as secure enclave available from APPLE INC. and similar technologies, biometric data can be compromised. In the event a person's biometric data is compromised, he/she might be unable to rely on the security of biometrics due to the unique and unchangeable nature of biometric data.

SUMMARY

Concepts and technologies disclosed herein are directed to aspects of a field-programmable gate array ("FPGA")-based biometric sampling system for improving biometric data reusability. According to some aspects of the concepts and technologies disclosed herein, an FPGA-based biometric sampling system can include one or more FPGAs, each of which can include a plurality of configurable input/output ("I/O") blocks, a plurality of configurable logic blocks, and a plurality of configurable interconnects that connect the plurality of configurable I/O blocks to the plurality of configurable logic blocks. The plurality of configurable I/O blocks, the plurality of configurable logic blocks, and the plurality of configurable interconnects can be configured based upon a hardware description language model to perform operations. In particular, an FPGA of the FPGA-based biometric sampling system can receive, by at least one configurable I/O block of the plurality of configurable I/O blocks, biometric input data associated with a user. The FPGA of the FPGA-based biometric sampling system can apply, by at least one configurable logic block of the plurality of configurable logic blocks, a sampling scheme to the biometric input data to extract, from the biometric input data, an enrollment biometric data sample. The FPGA of the FPGA-based biometric sampling system can cause, by the at least one configurable logic block of the plurality of configurable logic blocks, the enrollment biometric data sample to be stored in a database.

The FPGA of the FPGA-based biometric sampling system also can receive, by the at least one configurable I/O block of the plurality of configurable I/O blocks, further biometric input data. The FPGA of the FPGA-based biometric sampling system can apply, by the at least one configurable logic block of the plurality of configurable logic blocks, the sampling scheme to the further biometric input data to extract, from the further biometric input data, an authentication biometric data sample. The FPGA of the FPGA-based biometric sampling system can compare, by the at least one configurable logic block of the plurality of configurable logic blocks, the enrollment biometric input data and the authentication biometric input data. The FPGA of the FPGA-based biometric sampling system can determine, by the at least one configurable logic block of the plurality of configurable logic blocks, if a match exists based, at least in part, upon comparing the enrollment biometric input data and the authentication biometric input data. In response to determining that a match exists, the FPGA of the FPGA-based biometric sampling system can identify, by the at least one configurable logic block of the plurality of configurable logic blocks, the user as being associated with the biometric input data and the further biometric input data. The FPGA of the FPGA-based biometric sampling system then can authenticate, by the at least one configurable logic block of the plurality of configurable logic blocks, the user for access to a secure resource, such as a local secure resource stored on a user device or a remote secure resources accessible by the user device via a network.

In some embodiments, the FPGA of the FPGA-based biometric sampling system can hash, by the at least one configurable logic block of the plurality of configurable logic blocks, via a hash function, the enrollment biometric input data to create hashed enrollment biometric input data. The FPGA of the FPGA-based biometric sampling system can cause, by the at least one configurable logic block of the plurality of configurable logic blocks, the hashed enrollment biometric data sample to be stored in the database.

In some embodiments, the biometric input data is or includes a biometric input tensor. The biometric input data, embodied as the biometric input tensor or otherwise, can be provided by the user via one or more biometric sensors. The biometric sensors can be standalone or integrated within a device, such as a user device associated with the user.

According to another aspect disclosed herein, in response to an identity of the user being in a compromised state, the FPGA of the FPGA-based biometric sampling system can reconfigure the plurality of configurable I/O blocks, the plurality of configurable logic blocks, and the plurality of configurable interconnects that connect the plurality of configurable I/O blocks to the plurality of configurable logic blocks thereby creating a plurality of reconfigured I/O blocks, a plurality of reconfigured logic blocks, and a plurality of reconfigured interconnects. The FPGA of the FPGA-based biometric sampling system can receive, by at least one reconfigured I/O block of the plurality of reconfigured I/O blocks, new biometric input data associated with the user. The FPGA of the FPGA-based biometric sampling system can apply, by at least one reconfigured logic block of the plurality of reconfigured logic blocks, a new sampling scheme to the new biometric input data to extract, from the new biometric input data, a new enrollment biometric data sample. The FPGA of the FPGA-based biometric sampling system then can cause, by the at least one reconfigured logic block of the plurality of reconfigured logic blocks, the new enrollment biometric data sample to be stored in the database. The new enrollment biometric data sample can overwrite/replace the enrollment biometric data sample.

According to another aspect disclosed herein, an FPGA programming system can generate a programming file based upon a hardware design for an FPGA-based biometric sampling system. The hardware design can be defined in a hardware description language ("HDL"), such as Verilog or VHDL, based upon a hardware design for an FPGA-based biometric sampling system. The FPGA programming system can transfer the programming file to a semiconductor device, such as an FPGA of the FPGA-based biometric sampling system. The semiconductor device can include a plurality of configurable I/O blocks, a plurality of configurable logic blocks, and a plurality of configurable interconnects that connect the plurality of configurable I/O blocks to the plurality of configurable logic blocks. The FPGA programming system can configure the semiconductor device of the FPGA-based biometric sampling in accordance with the programming file.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
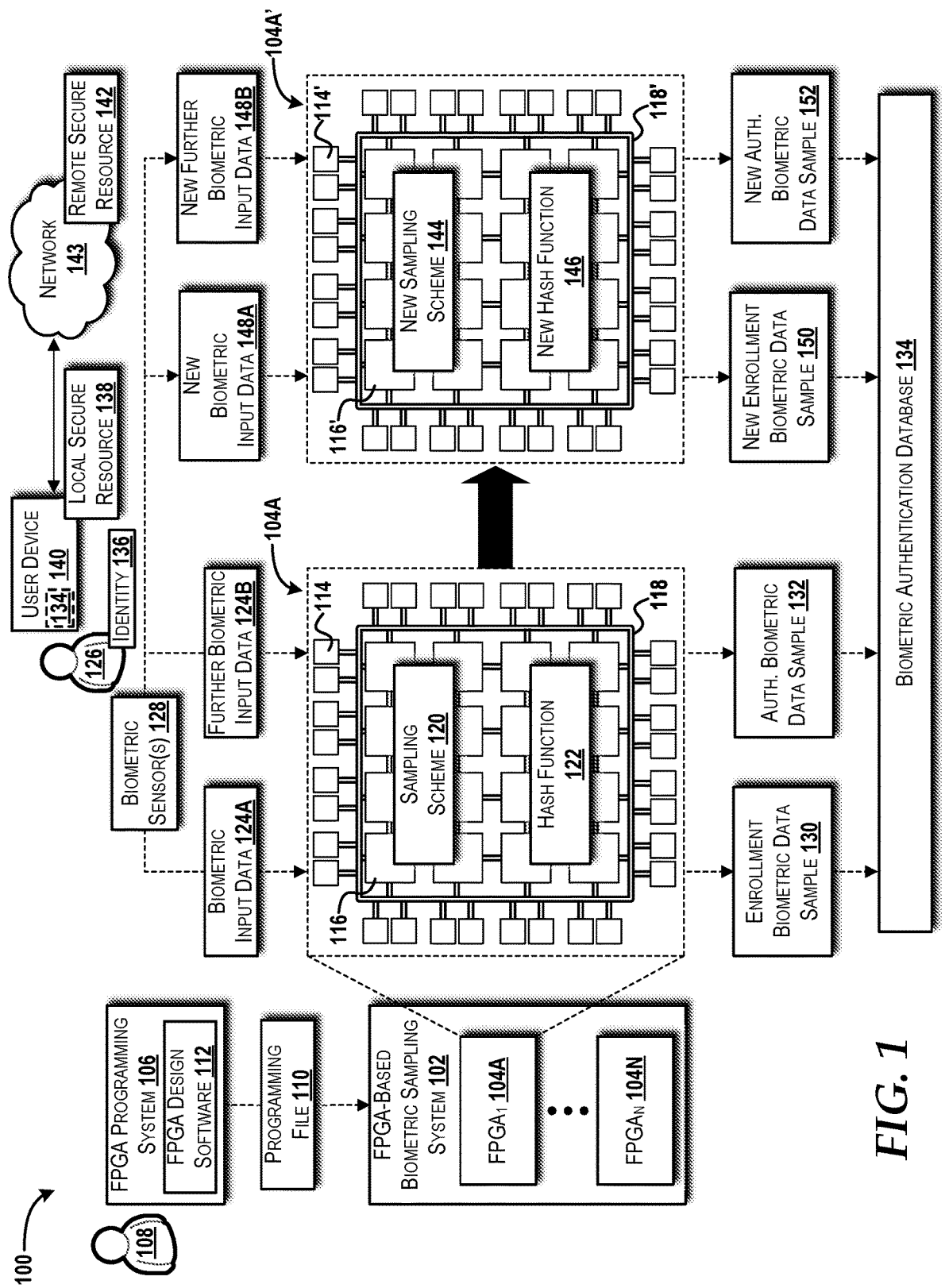
FIG. 1 is a block diagram illustrating aspects of an illustrative operating environment for various concepts and technologies disclosed herein.

The concepts and technologies disclosed herein provide an FPGA-based biometric sampling system for improving biometric data reusability. Biometrics are an excellent way to secure devices and systems, but current biometric technologies lack reusability in the event that a user's biometric data is compromised. Since consumers will continue to expect the use of biometrics in their various devices and systems, current biometric systems need to be improved with longevity in mind. The concepts and technologies disclosed herein address this issue among others.

Current biometric methods use an entire sample obtained from a biometric sensor. For example, a current fingerprint sensor scans a fingerprint and then applies or causes application of a hash function to the entirety of the fingerprint data in preparation for secure storage as a file on a device (e.g., a user device such as a smartphone). This method presents a problem for reusability of the fingerprint data if the hardware/software of the device is ever compromised by a malicious actor, in that the entire biometric data file is stored in some form on the device.

In a typical biometric method, a device obtains biometric input data from a user and passes the biometric input data through a function that disguises the original raw data. This data is stored on the device in some form. Later, when the user wants to unlock or use a biometric-based part of the device or other system, the device again obtains biometric input data from the user and compares this data to the stored biometric data. This biometric method has a vulnerability. In particular, if the function used to disguise the raw biometric data is obtained by a malicious actor, the raw biometric data can be recovered by the malicious actor and potentially used to spoof the identity of the user.

The concepts and technologies disclosed herein provide, at least in part, a novel biometric device implemented via a configurable semiconductor device such as an FPGA. The novel biometric device allows unbounded reusability of biometric data, even in the event some of the biometric data is compromised. In particular, the biometric device disclosed herein obtains only a portion of the biometric input data according to a sampling scheme. The biometric device can be unique for each user, reconfigured to use a new sampling scheme in the event of any sort of system compromise, and can sample from any number of biometric input data sources. Moreover, since biometric tensors have an extremely large number of data points, there are an unbounded number of ways to reuse the same fingerprint, iris, or other biometric data in the event that the system is compromised and a password reset is required.

The concepts and technologies disclosed herein improve upon existing biometric methods in several ways, including reusability, increased security, and the ability to integrate multiple biometric data types. The concepts and technologies disclosed herein are reusable because they allow for password resets in the event of system compromise. The concepts and technologies disclosed herein provide increased security due to the reduction in the number of meaningful attack vectors on the system, and the fact that compromise is not permanent (as in the case when using the entire biometric data). Current systems can use multiple biometrics, such as both faces and fingerprints, to authenticate users. However, these systems suffer from the same vulnerability that single input systems have as described above. The concepts and technologies disclosed herein address this vulnerability, at least in part, by sampling from both input tensors. The concepts and technologies disclosed herein can be applied to any existing devices that use biometrics, including cell phones, laptops, door locks, Internet of Things ("IoT") device, and the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, an operating environment 100 in which embodiments of the concepts and technologies disclosed herein will be described. The illustrated operating environment 100 includes an FPGA-based biometric sampling system 102 that utilizes one or more FPGAs 104A-104N (hereinafter, at times, referred to collectively as "FPGAs 104" or individually as "FPGA 104") for improving biometric data reusability in accordance with the concepts and technologies disclosed herein. Although the FPGA-based biometric sampling system 102 is described based upon concepts of an FPGA, other configurable semiconductor devices are contemplated in addition to or as an alternative to the FPGAs 104. As such, the FPGA-based biometric sampling system 102 described herein as being based upon the FPGAs 104 should not preclude other implementations that utilize different configurable semiconductor technologies.

The FPGA-based biometric sampling system 102 can be programmed via an FPGA programming system 106 based upon a hardware design provided by a hardware designer 108. In particular, the hardware designer 108 can utilize the FPGA programming system 106 to create a programming file 110 that defines, in any hardware description language ("HDL"), the hardware design of one or more of the FPGAs 104. Common HDLs, such as Verilog or Very High Speed Integrated Circuit Hardware Description Language ("VHDL"), are contemplated in addition to other standardized HDLs that might become available in the future. Proprietary HDLs also are contemplated.

The FPGA programming system 106 can execute, via one or more processors (best shown in FIGS. 6 and 7), FPGA design software 112 to aid in designing the FPGAs 104, synthesizing the design(s), optimizing the design(s), verifying the design(s), simulating the design(s), and creating the programming file 110 used to program the FPGAs 104 to implement aspects of the concepts and technologies disclosed herein for improving biometric data reusability. The FPGA design software 112 can be or can include any commercially available FPGA design software, some examples of which include, but are not limited to, INTEL QUARTUS available from Intel Corporation and VIVADO available from Xilinx Inc. Proprietary implementations of the FPGA design software also are contemplated. The FPGA programming system 106 is described herein as a single computer system for ease of explanation, but can alternatively be embodied as multiple computer systems, including distributed computing systems that utilize cloud computing technologies. An example cloud computing platform 900 upon which the FPGA programming system 106 can run is described herein below with reference to FIG. 9.

The complexities of designing the FPGAs 104, synthesizing the design(s), optimizing the design(s), verifying the design(s), simulating the design(s), and creating the programming file 110 used to program the FPGAs 104 will not be described in further detail herein. Those skilled in the art will appreciate the numerous approaches that can be taken to design, test, and ultimately configure the FPGAs 104 to enable aspects of the concepts and technologies disclosed herein for improving biometric data reusability. As such, the simplified examples provided herein should not be construed as being limiting in any way.

The FPGA$_1$ 104A is shown in greater detail, including a plurality of configurable I/O blocks 114 (hereinafter, at times, referred to collectively as "I/O blocks 114" or individually as "I/O block 114"), a plurality of configurable logic blocks 116 (hereinafter, at times, referred to collectively as "logic blocks 116" or individually as "logic block 116"), and a plurality of configurable interconnects 118 (hereinafter, at times, referred to collectively as "interconnects 118" or individually as "interconnect 118"). The I/O blocks 114 can receive data signals from external systems/devices and can transmit data signals to external systems/devices. The logic blocks 116 contain the logic for the FPGA 104 to implement the concepts and technologies disclosed herein for improving biometric data reusability. The logic blocks 116 can include random access memory ("RAM") used to create lookup tables ("LUTs"), in addition to flip-flops and multiplexers. The interconnects 118 connect the I/O blocks 114 and the logic blocks 116. Although not shown in the illustrated example, the FPGAs 104, in addition to the I/O blocks 114, the logic blocks 116, and the interconnects 118, can include clock circuitry, arithmetic logic units ("ALUs"), memory, decoders, flip-flops, multiplexors, and the like. Those skilled in the art will appreciate the hardware components of the FPGAs 104 can be selected based upon the needs of a given implementation of the concepts and technologies disclosed herein.

In the illustrated embodiment, the programming file 110 has been loaded onto the FPGA$_1$ 104A to configure the I/O blocks 114, the logic blocks 116, and the interconnects 118 based upon an HDL model (not shown) to implement a sampling scheme 120 and a hash function 122. The sampling scheme 120 receives, as input via one or more of the I/O blocks 114, biometric input data 124A and further biometric input data 124B (collectively, "biometric input data 124") associated with a user 126 from one or more biometric sensors 128 and extracts therefrom an enrollment biometric data sample 130 and an authentication biometric data sample 132, respectively. The enrollment biometric data sample 130 allows the user 126 to enroll in a biometric authentication service provided, in part, by a biometric authentication database 134. The enrollment biometric data sample 130 includes a portion of the biometric input data 124A that is stored in the biometric authentication database 134 for comparison to the authentication biometric data sample 132 created by the sampling scheme 120 in response to the further biometric input data 124B provided to the FPGA 104A responsive to a request to authenticate a unique identity ("identity") 136 of the user 126 for access to a local secure resource 138 associated with a user device 140 and/or a remote secure resource 142 accessible by the user device 140 via a network 143.

The biometric input data 124 can uniquely identify the user 126 from other users (not shown) such as to identify the user 126 by the identity 136. The biometric sensor(s) 128 can be implemented in the user device 140, can be stand-alone sensors, or can be implemented in another computing system or device (not shown). The biometric sensor(s) 128 are described herein in context of popular biometric sensors, such as, for example, fingerprint sensors, face recognition sensors, and iris sensors, although the concepts and technologies disclosed herein should not be construed as being limiting to any particular type of biometric sensor 128, and therefore, also does not limit the type of biometric input data 124 that can be obtained for use in accordance with the concepts and technologies disclosed herein. Moreover, the biometric sensor(s) 128 are intended to be representative of both hardware and software components used to obtain the biometric input data 124. The software can be executed locally by the biometric sensors 128 or via another system or device, such as the user device 140.

The local secure resource 138 can be any application, file, data, service, or other resource that is available, at least in part, locally from the user device 140. The remote secure resource 142 can be any application, file, data, service, or other resource that is available, at least in part, remotely from a system or device operating remote to the user device 140 and made accessible via the network 143.

The functionality of the user device 140 can be provided by one or more mobile telephones, smartphones, tablet computers, slate computers, smart watches, smart glasses, other wearable devices, other smart devices, Internet of Things ("IoT") devices, security devices, media playback devices, video game systems, navigation devices, connected cars, infotainment systems, laptop computers, notebook computers, ultrabook computers, netbook computers, computers of other form factors, computing devices of other form factors, other computing systems, other computing devices, and/or the like. It should be understood that the functionality of each of the user device 140 can be provided by a single device, by two or more similar devices, and/or by two or more dissimilar devices. An example architecture that can be utilized by the user device 140 in context of a mobile telephone or smartphone is illustrated and described herein with reference to FIG. 7.

The network 143 can be or can include, at least in part, one or more mobile telecommunications networks that operate in accordance with one or more mobile telecommunications standards, including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. The mobile telecommunications networks can include one or more radio access networks ("RANs") that may utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide the radio/air interface to the user device 140. Data communications can be provided in part by the RAN(s) using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN(s) may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The network 143 can alternatively or additionally include one or more personal area networks ("PANs"), one or more local area networks ("LANs"), one or more metropolitan area networks ("MANs"), one or more wide area networks ("WANs"), operating via any wired or wireless communication technology. An example embodiment of the network 143 is illustrated and described herein with reference to FIG. 8.

In accordance with one aspect of the concepts and technologies disclosed herein, the FPGA$_1$ 104A can be reconfigured, at least in part, in response to the enrollment biometric data sample 130 and/or the authentication biometric data sample 132 being compromised. In the illustrated example, the FPGA$_1$ 104A has been reprogrammed as the FPGA$_1$ 104A' that utilizes a new sampling scheme 144 and a new hash function 146. The FPGA$_1$ 104A' can be reprogrammed based upon a new programming file (not shown) that has been loaded onto the FPGA$_1$ 104A to reconfigure the I/O blocks 114, the logic blocks 116, and the interconnects 118 based upon a new HDL model (also not shown) as reconfigured I/O blocks 114', reconfigured logic blocks 116', and reconfigured interconnects 118' to implement the new sampling scheme 144 and the new hash function 146. The new sampling scheme 144 receives, as input via one or more of the reconfigured I/O blocks 114', new biometric input data 148A and new further biometric input data 148B associated with the user 126 from the biometric sensor(s) 128 and extracts therefrom a new enrollment biometric data sample 150 and a new authentication biometric data sample 152, respectively. The new enrollment biometric data sample 150 allows the user 126 to re-enroll in the biometric authentication service provided, in part, by the biometric authentication database 134. The new enrollment biometric data sample 150 includes a portion of the new biometric input data 148A that is stored in the biometric authentication database 134 for comparison to the new authentication biometric data sample 152 created by the new sampling scheme 144 in response to the new further biometric input data 148B provided to the FPGA$_1$ 104A' responsive to a request to authenticate the unique identity ("identity") 136 of the user 126 for access to the local secure resource 138 associated with the user device 140 and/or the remote secure resource 142 accessible by the user device 140 via the network 143. In this manner, the entirety of the biometric input data 124A and the further biometric input data 124B is not used, and therefore, the same biometric data source such as a fingerprint sensor, face recognition sensor, or iris sensor (e.g., the biometric sensors 128) can be used without concern for the identity 136 of the user 126 being exposed even though the enrollment biometric data sample 130 and/or the authentication biometric data sample 132 was compromised.

Figure 2:
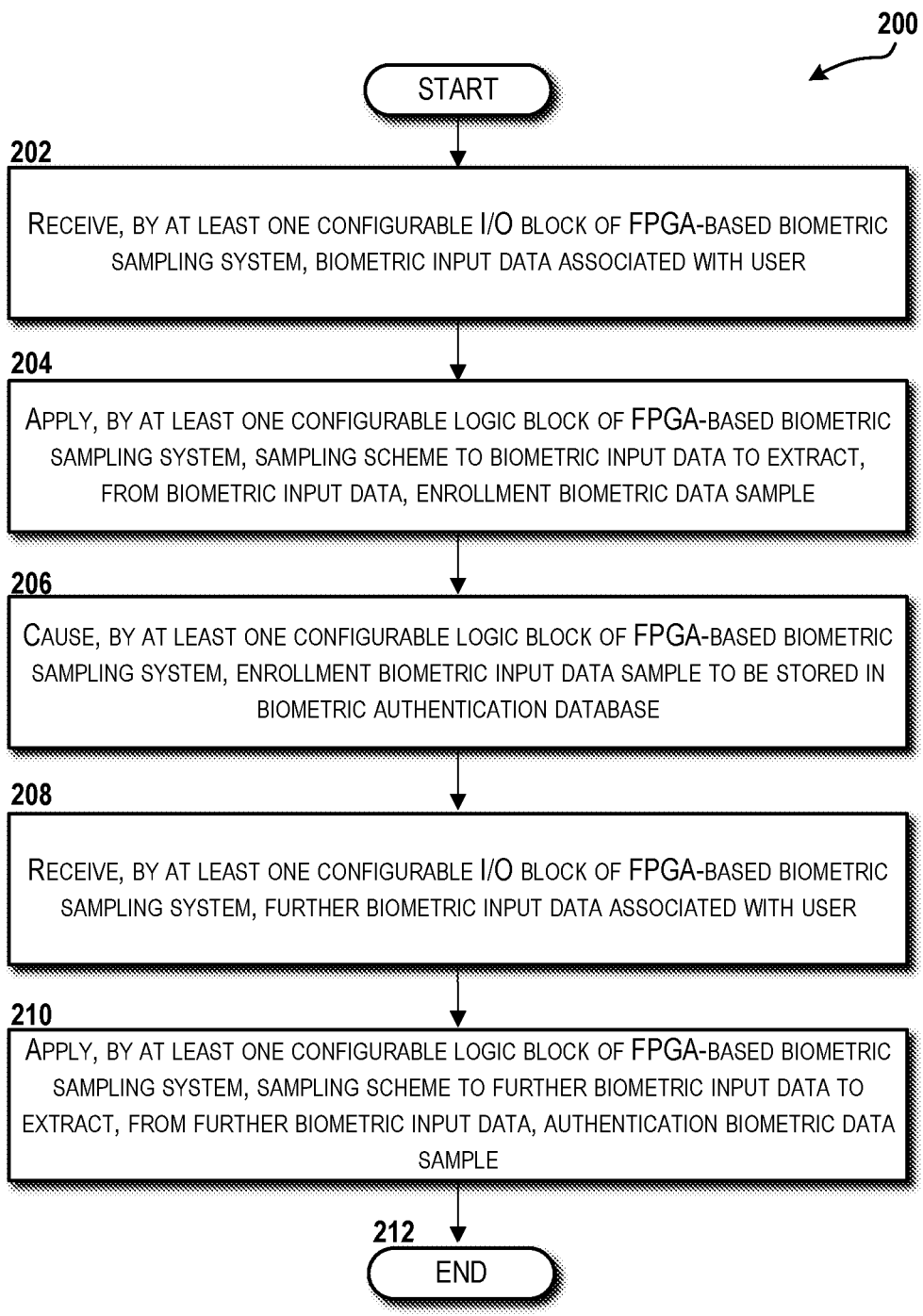
FIG. 2 is a flow diagram illustrating aspects of a method for applying a sampling scheme to biometric input data to improve biometric data reusability, according to an illustrative embodiment of the concepts and technologies disclosed herein.

Turning now to FIG. 2, a flow diagram illustrating aspects of a method 200 for applying the sampling scheme 120 to the biometric input data 124 to improve biometric data reusability will be described, according to an illustrative embodiment of the concepts and technologies disclosed herein. FIG. 2 will be described with additional reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the FPGA programming system 106 or the user device 140, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. Moreover, the method 200 will be described from the perspective of the FPGA-based biometric sampling system 102 using one FPGA 104, such as the FPGA$_1$ 104A shown in FIG. 1. It should be understood, however, that operations described as part of the method 200 can be applied to the FPGA-based biometric sampling system 102 in embodiments where multiple FPGAs 104 are used. Multiple FPGA 104 configurations can enable, in some embodiments, parallel processing of multiple inputs from the biometric sensors 128, including, for example, the biometric input data 124A, 124B being sourced from different types of the biometric sensors 128 (e.g., one for fingerprint recognition, one for face recognition, and one for iris recognition).

The method 200 begins and proceeds to operation 202, where the FPGA-based biometric sampling system 102 receives, by at least one of the I/O blocks 114, the biometric input data 124A associated with the user 126. From operation 202, the method 200 proceeds to operation 204, where the FPGA-based biometric sampling system 102 applies, by at least one of the logic blocks 116, the sampling scheme 120 to the biometric input data 124A to extract, from the biometric input data 124A, the enrollment biometric data sample 130. From operation 204, the method 200 proceeds to operation 206, where the FPGA-based biometric sampling system 102 causes, by at least one of the logic blocks 116, the enrollment biometric data sample 130 to be stored in the biometric authentication database 134.

From operation 206, the method 200 proceeds to operation 208, where the FPGA-based biometric sampling system 102 receives, by at least one of the I/O blocks 114, the further biometric input data 124B associated with the user 126. From operation 208, the method 200 proceeds to operation 210, the FPGA-based biometric sampling system 102 applies, by at least one of the logic blocks 116, the sampling scheme 120 to the further biometric input data 124B to extract, from the further biometric input data 124B, the authentication biometric data sample 132. From operation 210, the method 200 proceeds to operation 212, where the method 200 ends.

Figure 3:
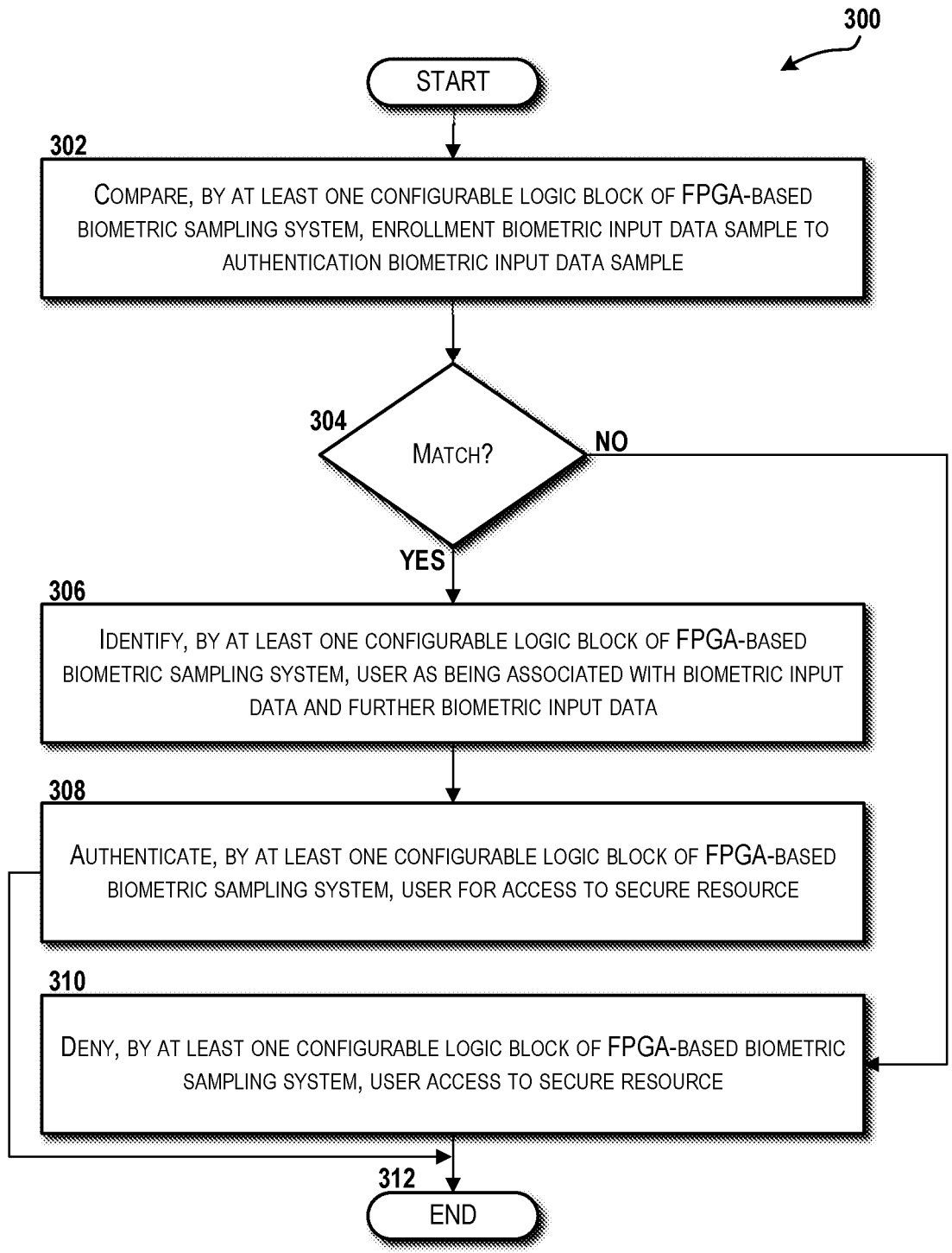
FIG. 3 is a flow diagram illustrating aspects of a method for authenticating a user for access to a secure resource, according to an illustrative embodiment of the concepts and technologies disclosed herein.

Turning now to FIG. 3, a method 300 for authenticating the user 126 for access to a secure resource, such as the local secure resource 138 or the remote secure resource 142, will be described according to an illustrative embodiment. The method 300 will be described with reference to FIG. 3 and further reference to FIG. 1. Moreover, the method 300 will be described from the perspective of the FPGA-based biometric sampling system 102 using one FPGA 104, such as the FPGA$_1$ 104A shown in FIG. 1. It should be understood, however, that operations described as part of the method 300 can be applied to the FPGA-based biometric sampling system 102 in embodiments where multiple FPGAs 104 are used.

The method 300 begins and proceeds to operation 302, where the FPGA-based biometric sampling system 102 compares, by at least one of the logic blocks 116, the enrollment biometric data sample 130 to the authentication biometric data sample 132. From operation 302, the method 300 proceeds to operation 304, where the FPGA-based biometric sampling system 102 determines if the enrollment biometric data sample 130 matches the authentication biometric data sample 132.

If the FPGA-based biometric sampling system 102 determines, at operation 304, that the enrollment biometric data sample 130 matches the authentication biometric data sample 132, the method 300 proceeds to operation 306, where the FPGA-based biometric sampling system 102 identifies, by at least one of the logic blocks 116, the user 126 as being associated with the biometric input data 124A and the further biometric input data 124B. From operation 306, the method 300 proceeds to operation 308, where the FPGA-based biometric sampling system 102 authenticates, by at least one of the logic blocks 116, the user 126 for access to the secure resource (e.g., the local secure resource 138 or the remote secure resource 142). If, however, the FPGA-based biometric sampling system 102 determines, at operation 304, that the enrollment biometric data sample 130 does not match the authentication biometric data sample 132, the method 300 proceeds to operation 310, where the FPGA-based biometric sampling system 102 denies, by at least one of the logic blocks 116, the user 126 access to the secure resource (e.g., the local secure resource 138 or the remote secure resource 142). From operation 308 or operation 310, the method 300 proceeds to operation 312, where the method 300 ends.

Figure 4:
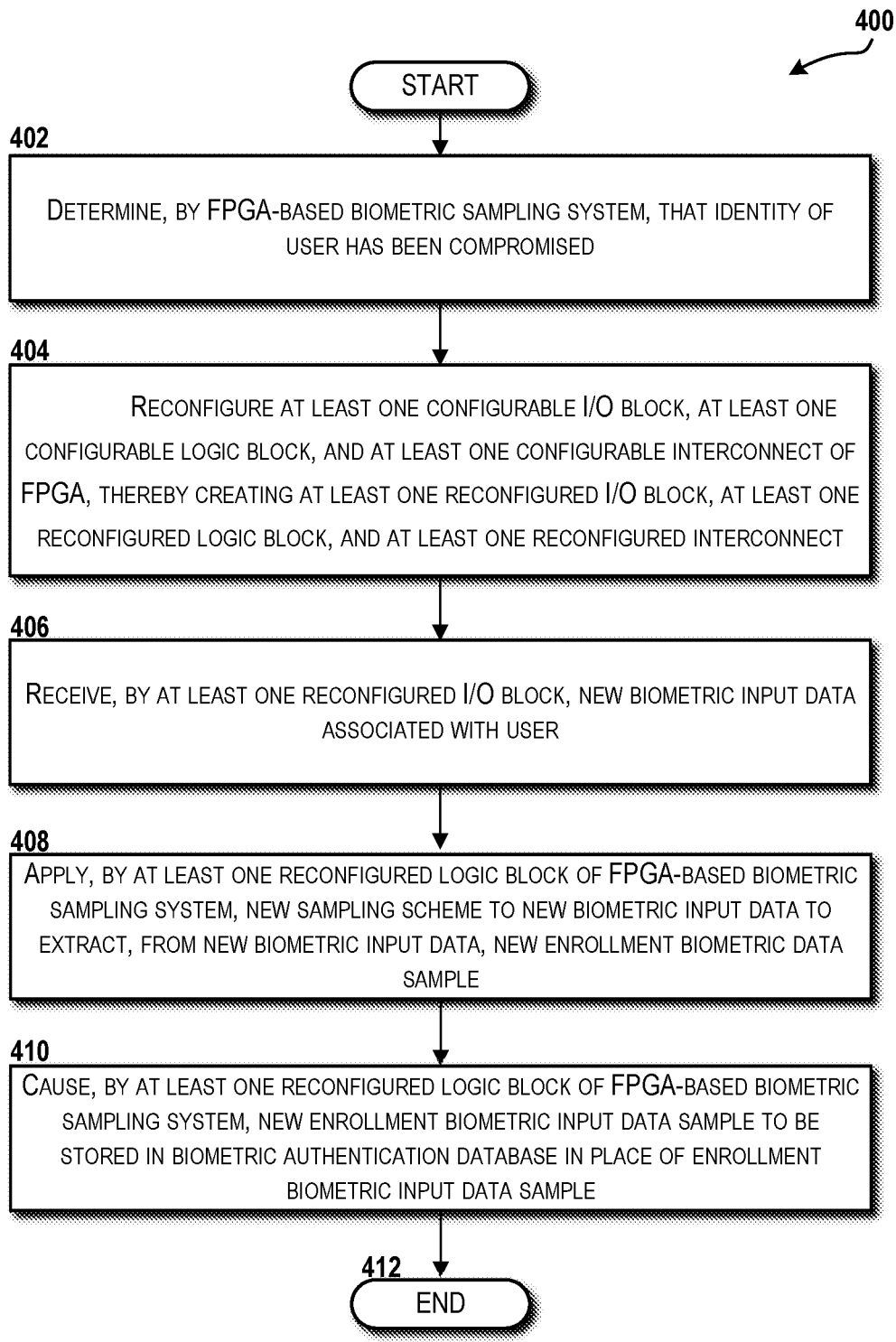
FIG. 4 is a flow diagram illustrating aspects of a method for applying a new sampling scheme to biometric input data in response to a user's identity being compromised, according to an illustrative embodiment of the concepts and technologies disclosed herein.

Turning now to FIG. 4, a method 400 for applying the new sampling scheme 144 to the new biometric input data 148A, 148B in response to the identity 136 of the user 126 being compromised will be described, according to an illustrative embodiment. The method 400 will be described with reference to FIG. 4 and further reference to FIG. 1. Moreover, the method 400 will be described from the perspective of the FPGA-based biometric sampling system 102 using one FPGA 104, such as the FPGA$_1$ 104A shown in FIG. 1. It should be understood, however, that operations described as part of the method 400 can be applied to the FPGA-based biometric sampling system 102 in embodiments where multiple FPGAs 104 are used.

The method 400 begins and proceeds to operation 402, where the FPGA-based biometric sampling system 102 determines that the identity 136 of the user 126 has been compromised. How and the degree to which the identity 136 of the user 126 is compromised does not matter for the performance of the operations of the method 400. Some examples of the identity 136 of the user 126 being compromised include, but are not limited to, user identity information (e.g., name, social security number, telephone number, address, and/or the like), user biometric information (e.g., the enrollment biometric data sample 130 and/or the authentication biometric data sample 132), user financial information (e.g., bank account information, credit card account information, mortgage account information, and/or the like), user security information (e.g., user name and password), and any other data the user 126 wants to be kept secure such as data that is, includes, or is otherwise associated with the local secure resource 138 and/or the remote secure resource 142.

From operation 402, the method 400 proceeds to operation 404, where at least one of the I/O blocks 114, at least one of the logic blocks 116, and at least one of the interconnects 118 of the $FPGA_1$ 104A are reconfigured. In this manner, at least one of the reconfigured I/O blocks 114', at least one of the reconfigured logic blocks 116', and at least one of the reconfigured interconnects 118' of the reconfigured $FPGA_1$ 104A' are created.

From operation 404, the method 400 proceeds to operation 406, where at least one of the reconfigured I/O blocks 114' receives the new biometric input data 148A associated with the user 126. In some embodiments, the new biometric input data 148A can include the same data as the biometric input data 124A, such as, for example, a fingerprint image, a face image, or an iris image. Although the biometric input data 124A and the new biometric input data 148A are the same in these embodiments, the sampling scheme 120 and the new sampling scheme 144 are able to extract different samples of the biometric input data 124A/the new biometric input data 148A (e.g., the enrollment biometric data sample 130 is different from the new enrollment biometric data sample 150).

From operation 406, the method 400 proceeds to operation 408, where at least one of the reconfigured logic blocks 116' applies the new sampling scheme 144 to the new biometric input data 148A to extract, from the new biometric input data 148A, the new enrollment biometric data sample 150. From operation 408, the method 400 proceeds to operation 410, where at least one of the reconfigured logic blocks 116' causes the new enrollment biometric data sample 150 to be stored in the biometric authentication database 134 in place of the enrollment biometric data sample 130. Similar to the operations 208, 210 of the method 200 shown in FIG. 2, the new further biometric input data 148B can be received, and the new sampling scheme 144 can be applied to the new further biometric input data 148B to extract, from the new further biometric input data 148B, the new authentication biometric data sample 152, which can be compared to the new enrollment biometric data sample 150 in accordance with the method 400, wherein the enrollment biometric data sample 130 is replaced with the new enrollment biometric data sample 150 and the authentication biometric data sample 132 is replaced with the new authentication biometric data sample 152. From operation 410, the method 400 proceeds to operation 412, where the method 400 ends.

Figure 5:
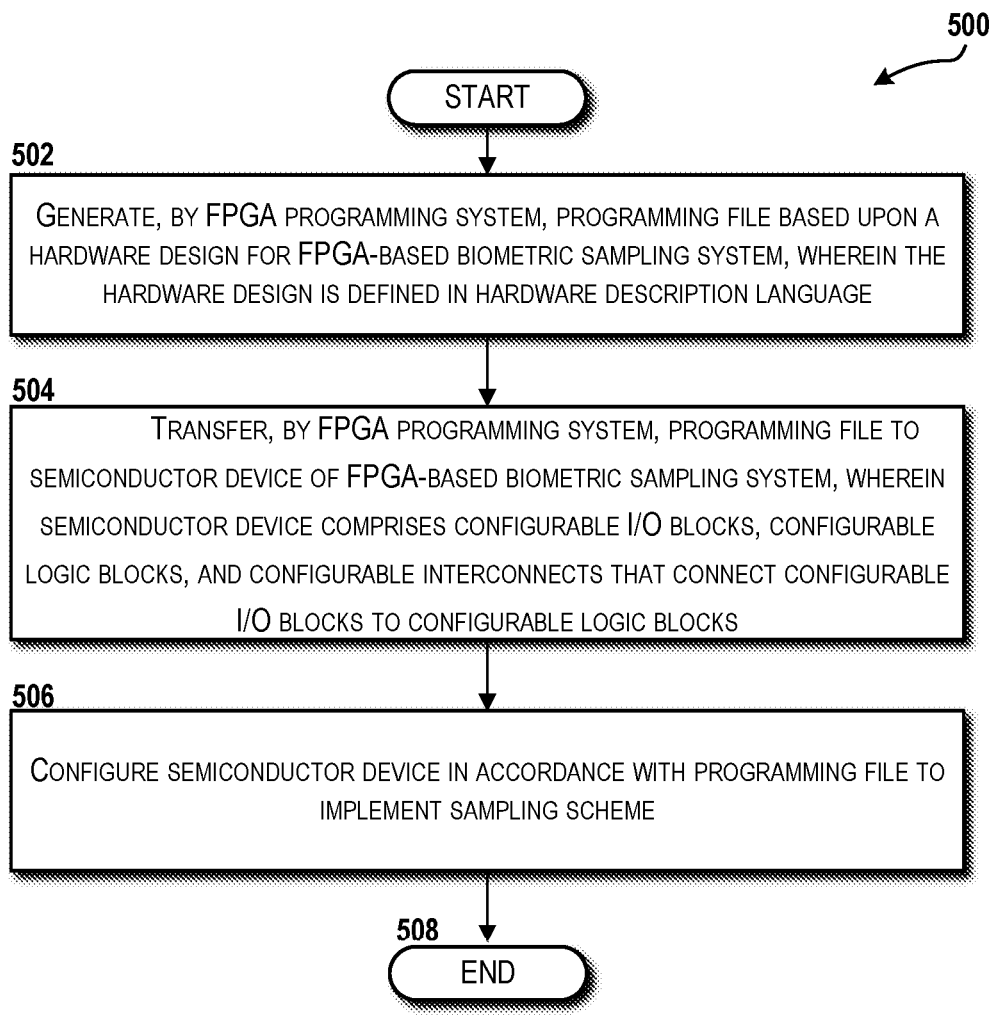
FIG. 5 is a flow diagram illustrating aspects of a method for configuring a semiconductor device to implement biometric sampling for improving biometric data reusability, according to an illustrative embodiment of the concepts and technologies disclosed herein.

Turning now to FIG. 5, a method 500 for configuring a semiconductor device, such as the FPGA 104, to implement biometric sampling for improving biometric data reusability will be described, according to an illustrative embodiment. The method 500 will be described with reference to FIG. 5 and further reference to FIG. 1. Moreover, the method 500 will be described from the perspective of the FPGA-based biometric sampling system 102 using one FPGA 104, such as the $FPGA_1$ 104A shown in FIG. 1. It should be understood, however, that operations described as part of the method 500 can be applied to the FPGA-based biometric sampling system 102 in embodiments where multiple FPGAs 104 are used.

The method 500 begins and proceeds to operation 502, where the FPGA programming system 106, via execution by one or more processors of the FPGA design software 112, generates the programming file 110 based upon a hardware design for the FPGA-based biometric sampling system 102 as defined in an HDL by the hardware designer 108. From operation 502, the method 500 proceeds to operation 504, where the FPGA programming system 106 transfers the programming file 110 to the $FPGA_1$ 104A (or other programmable semiconductor device in alternative embodiments described herein). From operation 504, the method 500 proceeds to operation 506, where the $FPGA_1$ 104A is configured in accordance with the programming file 110 to implement the sampling scheme 120. From operation 506, the method 500 proceeds to operation 508, where the method 500 ends.

Figure 6:
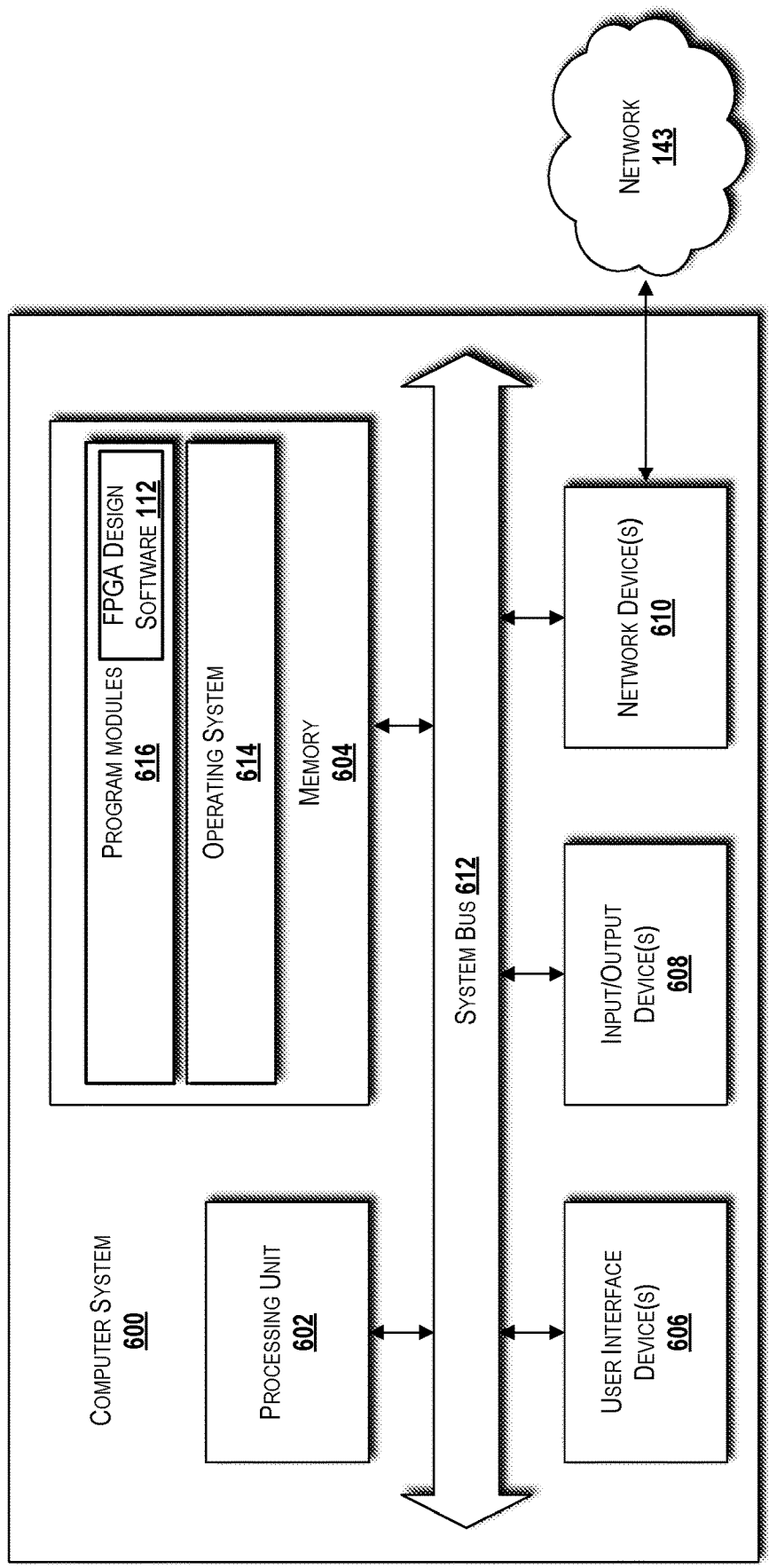
FIG. 6 is a block diagram illustrating an example computer system, according to some illustrative embodiments.

Turning now to FIG. 6, a block diagram illustrating a computer system 600 configured to provide the functionality described herein in accordance with various embodiments of the concepts and technologies disclosed herein. In some embodiments, the FPGA programming system 106 and/or the user device 140 can be configured like and/or can have an architecture similar or identical to the computer system 600 described herein with respect to FIG. 6. It should be understood, however, any of these systems, devices, or elements may or may not include the functionality described herein with reference to FIG. 6.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules described herein, such as the FPGA design software 112. By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium," "computer-readable storage medium," and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer to output data.

The network devices 610 enable the computer system 600 to communicate with other networks or remote systems via one or more networks, such as the network 143. Examples of the network devices 610 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 7:
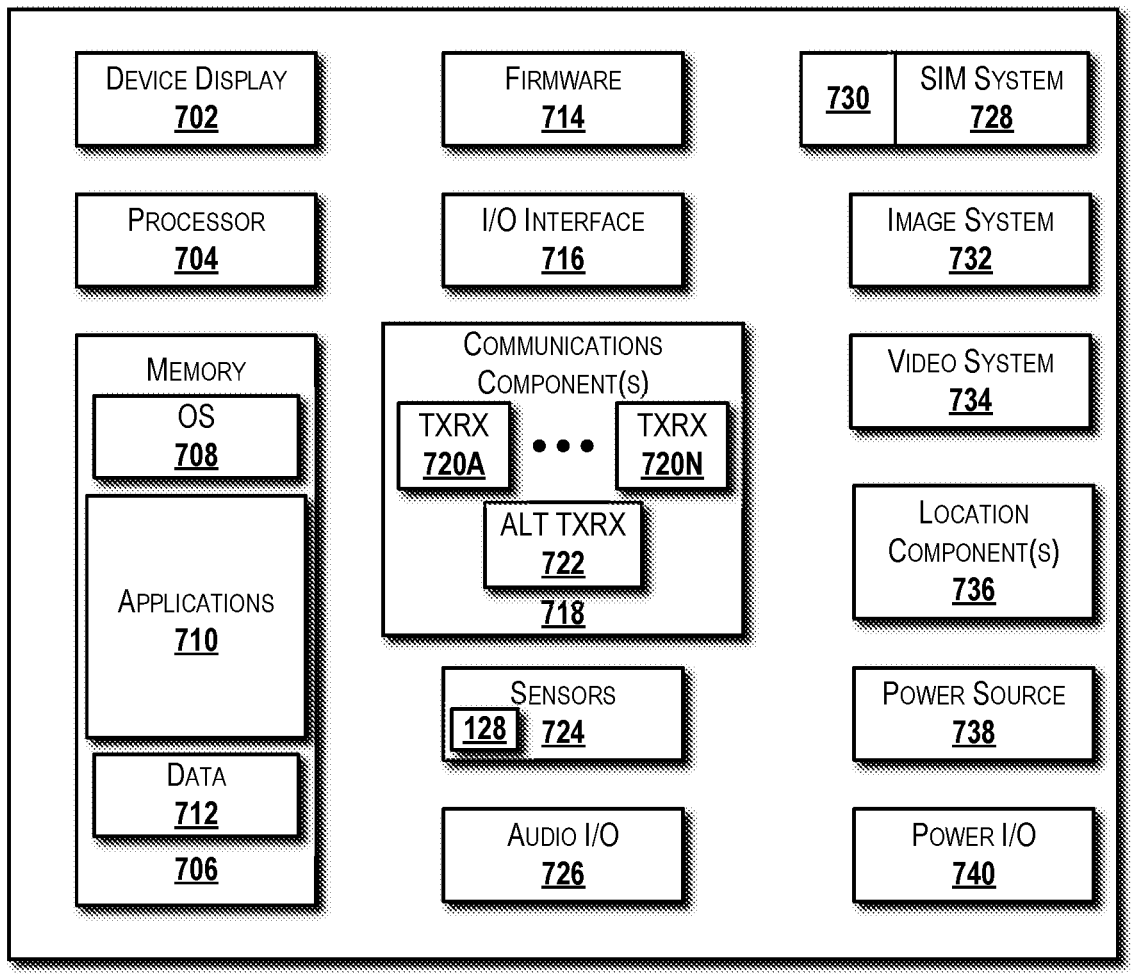
FIG. 7 is a block diagram illustrating an example mobile device, according to some illustrative embodiments.

Turning now to FIG. 7, an illustrative mobile device 700 and components thereof will be described. In some embodiments, the FPGA programming system 106 and/or the user device 140 can be configured as and/or can have an architecture similar or identical to the mobile device 700 described herein with respect to FIG. 7. It should be understood, however, that the FPGA programming system 106 and/or the user device 140 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a device display 702 for displaying data. According to various embodiments, the device display 702 can be configured to display any information. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in the memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in interacting with data. The UI application can be executed by the processor 704 to aid a user in answering/initiating calls, entering/deleting other data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700.

According to various embodiments, the applications 710 can include, for example, the FGPA design software 112, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It should be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks, such as the network 143. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 7G and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include the biometric sensors 128, temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. One or more of the sensors 724 can be used to detect movement of the mobile device 700. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, CCDs, combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a specific location of the mobile device 700. According to various embodiments, the location components 736 can send and/or receive signals from GPS devices, A-GPS devices, WI-FI/WIMAX and/or cellular network triangulation data, combinations thereof, and the like. The location component 736 also can be configured to communicate with the communications component 718 to retrieve triangulation data from the network 143 for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
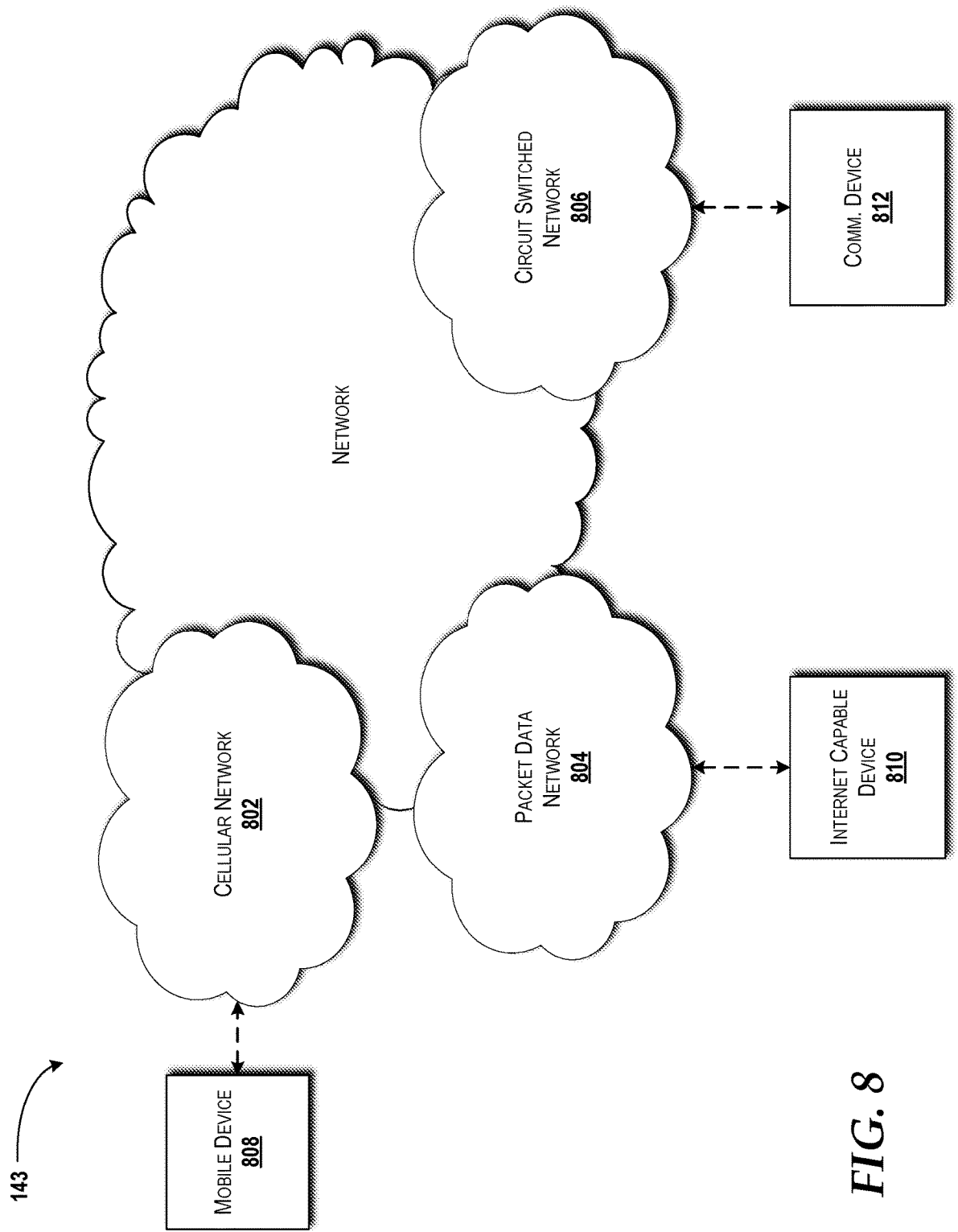
FIG. 8 schematically illustrates a network, according to an illustrative embodiment.

Turning now to FIG. 8, additional details of an embodiment of the network 143 are illustrated, according to an illustrative embodiment. The network 143 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the user device 140, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSDPA), and HSPA+. The cellular network 802 also is compatible with 4G mobile communications standards as well as evolved and future mobile standards. In some embodiments, the network 143 can be configured like the cellular network 802.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet.

The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 808, for example, the user device 140, a personal computer ("PC"), a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. It should be appreciated that substantially all of the functionality described with reference to the network 143 can be performed by the cellular network 802, the packet data network 804, and/or the circuit switched network 806, alone or in combination with additional and/or alternative networks, network elements, and the like.

Figure 9:
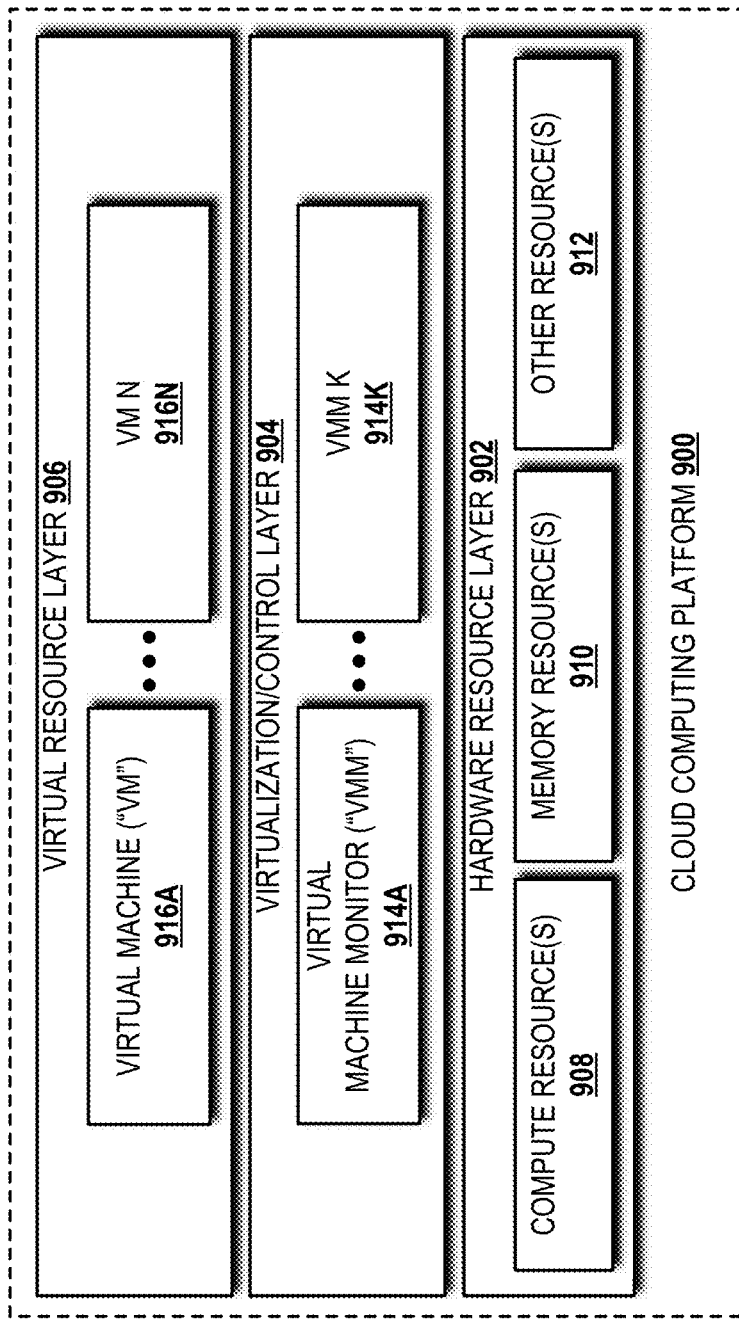
FIG. 9 is a block diagram illustrating a cloud computing platform capable of implementing aspects of the concepts and technologies disclosed herein.

Turning now to FIG. 9, a cloud computing platform 900 capable of implementing aspects of the concepts and technologies disclosed herein will be described, according to an illustrative embodiment. In some embodiments, the FPGA-based biometric sampling system 102, the FPGA programming system 106, and/or the user device 140 can be implemented, at least in part on the cloud computing platform 900. Those skilled in the art will appreciate that the illustrated cloud computing platform 900 is a simplification of but one possible implementation of an illustrative cloud computing environment, and as such, the cloud computing platform 900 should not be construed as limiting in any way.

The illustrated cloud computing platform 900 includes a hardware resource layer 902, a virtualization/control layer 904, and a virtual resource layer 906 that work together to perform operations as will be described in detail herein. While connections are shown between some of the components illustrated in FIG. 9, it should be understood that some, none, or all of the components illustrated in FIG. 9 can be configured to interact with one other to carry out various functions described herein. In some embodiments, the components are arranged so as to communicate via one or more networks (not shown). Thus, it should be understood that FIG. 9 and the following description are intended to provide a general understanding of a suitable environment in which various aspects of embodiments can be implemented, and should not be construed as being limiting in any way.

The hardware resource layer 902 provides hardware resources, which, in the illustrated embodiment, include one or more compute resources 908, one or more memory resources 910, and one or more other resources 912. The compute resource(s) 908 can include one or more hardware components that perform computations to process data, and/or to execute computer-executable instructions of one or more application programs, operating systems, and/or other software. The compute resources 908 can include one or more central processing units ("CPUs") configured with one or more processing cores. The compute resources 908 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 908 can include one or more discrete GPUs. In some other embodiments, the compute resources 908 can include CPU and GPU components that are configured in accordance with a co-processing CPU/GPU computing model, wherein the sequential part of an application executes on the CPU and the computationally-intensive part is accelerated by the GPU. The compute resources 908 can include one or more system-on-chip ("SoC") components along with one or more other components, including, for example, one or more of the memory resources 910, and/or one or more of the other resources 912. In some embodiments, the compute resources 908 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 908 can be or can include one or more hardware components architected in accordance with an ARM architecture, available for license from ARM HOLDINGS of Cambridge, United Kingdom. Alternatively, the compute resources 908 can be or can include one or more hardware components architected in accordance with an x86 architecture, such an architecture available from INTEL CORPORATION of Mountain View, Calif., and others. Those skilled in the art will appreciate the implementation of the compute resources 908 can utilize various computation architectures, and as such, the compute resources 908 should not be construed as being limited to any particular computation architecture or combination of computation architectures, including those explicitly disclosed herein.

The memory resource(s) 910 can include one or more hardware components that perform storage operations, including temporary or permanent storage operations. In some embodiments, the memory resource(s) 910 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 908.

The other resource(s) 912 can include any other hardware resources that can be utilized by the compute resources(s) 908 and/or the memory resource(s) 910 to perform operations described herein. The other resource(s) 912 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 902 can be virtualized by one or more virtual machine monitors ("VMMs") 914A-914K (also known as "hypervisors;" hereinafter "VMMs 914") operating within the virtualization/control layer 904 to manage one or more virtual resources that reside in the virtual resource layer 906. The VMMs 914 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916"). In some embodiments, one or more of the VMs 916 can provide the functionality of the FPGA programming system 106, such as via execution of the FPGA design software 112.

Based on the foregoing, it should be appreciated that aspects of an FPGA-based biometric sampling system for improving biometric data reusability have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A field-programmable gate array ("FPGA") based biometric sampling system comprising:
    a plurality of configurable input/output ("I/O") blocks;
    a plurality of configurable logic blocks; and
    a plurality of configurable interconnects that connect the plurality of configurable I/O blocks to the plurality of configurable logic blocks;
    wherein the plurality of configurable I/O blocks, the plurality of configurable logic blocks, and the plurality of configurable interconnects are configured based upon a hardware description language model to perform operations comprising
        receiving, by at least one configurable I/O block of the plurality of configurable I/O blocks, biometric input data associated with a user,
        applying, by at least one configurable logic block of the plurality of configurable logic blocks, a sampling scheme to the biometric input data to extract, from the biometric input data, an enrollment biometric data sample,
        causing, by the at least one configurable logic block of the plurality of configurable logic blocks, the enrollment biometric data sample to be stored in a database, and
        in response to an identity of the user being in a compromised state,
            reconfiguring the plurality of configurable I/O blocks, the plurality of configurable logic blocks, and the plurality of configurable interconnects that connect the plurality of configurable I/O blocks to the plurality of configurable logic blocks thereby creating a plurality of reconfigured I/O blocks, a plurality of reconfigured logic blocks, and a plurality of reconfigured interconnects,
            receiving, by at least one reconfigured I/O block of the plurality of reconfigured I/O blocks, new biometric input data associated with the user,
            applying, by at least one reconfigured logic block of the plurality of reconfigured logic blocks, a new sampling scheme to the new biometric input data to extract, from the new biometric input data, a new enrollment biometric data sample, and
            causing, by the at least one reconfigured logic block of the plurality of reconfigured logic blocks, the new enrollment biometric data sample to be stored in the database.

2. The FPGA-based biometric sampling system of claim 1, wherein the operations further comprise:
    receiving, by the at least one configurable I/O block of the plurality of configurable I/O blocks, further biometric input data;
    applying, by the at least one configurable logic block of the plurality of configurable logic blocks, the sampling scheme to the further biometric input data to extract, from the further biometric input data, an authentication biometric data sample;
    comparing, by the at least one configurable logic block of the plurality of configurable logic blocks, the enrollment biometric data sample and the authentication biometric input data sample; and
    determining, by the at least one configurable logic block of the plurality of configurable logic blocks, if a match exists based, at least in part, upon comparing the enrollment biometric data sample and the authentication biometric input data sample.

3. The FPGA-based biometric sampling system of claim 2, wherein the operations further comprise, in response to determining that the match exists:
    identifying, by the at least one configurable logic block of the plurality of configurable logic blocks, the user as being associated with the biometric input data and the further biometric input data; and
    authenticating, by the at least one configurable logic block of the plurality of configurable logic blocks, the user for access to a secure resource.

4. The FPGA-based biometric sampling system of claim 3, wherein the secure resource comprises a local secure resource of a user device.

5. The FPGA-based biometric sampling system of claim 3, wherein the secure resource comprises a remote secure resource of a user device.

6. The FPGA-based biometric sampling system of claim 2, wherein the operations further comprise, in response to determining that the match does not exist, denying, by the at least one configurable logic block of the plurality of configurable logic blocks, the user access to a secure resource.

7. The FPGA-based biometric sampling system of claim 1, wherein the operations further comprise hashing, by the at least one configurable logic block of the plurality of configurable logic blocks, via a hash function, the enrollment biometric data sample to create hashed enrollment biometric data sample; and wherein causing, by the at least one configurable logic block of the plurality of configurable logic blocks, the enrollment biometric data sample to be stored in the database comprises causing, by the at least one configurable logic block of the plurality of configurable logic blocks, the hashed enrollment biometric data sample to be stored in the database.

8. The FPGA-based biometric sampling system of claim 1, wherein the biometric input data comprises a biometric input tensor.

9. The FPGA-based biometric sampling system of claim 1, wherein the biometric input data is provided by the user via a biometric sensor.

10. A method comprising:
    receiving, by at least one configurable input/output ("I/O") block of a plurality of configurable I/O blocks of a field-programmable gate array ("FPGA")-based biometric sampling system, biometric input data associated with a user;
    applying, by at least one configurable logic block of a plurality of configurable logic blocks of the FPGA-based biometric sampling system, a sampling scheme to the biometric input data to extract, from the biometric input data, an enrollment biometric data sample;
    causing, by at least one configurable logic block of the plurality of configurable logic blocks of the FPGA-based biometric sampling system, the enrollment biometric data sample to be stored in a database; and in response to an identity of the user being in a compromised state,
reconfiguring the plurality of configurable I/O blocks, the plurality of configurable logic blocks, and a plurality of configurable interconnects that connect the plurality of configurable I/O blocks to the plurality of configurable logic blocks thereby creating a plurality of reconfigured I/O blocks, a plurality of reconfigured logic blocks, and a plurality of reconfigured interconnects,
receiving, by at least one reconfigured I/O block of the plurality of reconfigured I/O blocks, new biometric input data associated with the user,
applying, by at least one reconfigured logic block of the plurality of reconfigured logic blocks, a new sampling scheme to the new biometric input data to extract, from the new biometric input data, a new enrollment biometric data sample, and
causing, by the at least one reconfigured logic block of the plurality of reconfigured logic blocks, the new enrollment biometric data sample to be stored in the database.

11. The method of claim 10 further comprising:
receiving, by the at least one configurable I/O block of the plurality of configurable I/O blocks, further biometric input data;
applying, by the at least one configurable logic block of the plurality of configurable logic blocks of the FPGA-based biometric sampling system, the sampling scheme to the further biometric input data to extract, from the further biometric input data, an authentication biometric data sample;
comparing, by the at least one configurable logic block of the plurality of configurable logic blocks of the FPGA-based biometric sampling system, the enrollment biometric data sample and the authentication biometric data sample; and
determining, by the at least one configurable logic block of the plurality of configurable logic blocks of the FPGA-based biometric sampling system, if a match exists, based, at least in part, upon comparing the enrollment biometric data sample and the authentication biometric data sample.

12. The method of claim 11, further comprising, in response to determining the match exists:
identifying, by the at least one configurable logic block of the plurality of configurable logic blocks of the FPGA-based biometric sampling system, the user as being associated with the biometric input data and the further biometric input data; and
authenticating, by the at least one configurable logic block of the plurality of configurable logic blocks of the FPGA-based biometric sampling system, the user for access to a secure resource.

13. The method of claim 12, wherein the secure resource comprises a local secure resource of a user device.

14. The method of claim 12, wherein the secure resource comprises a remote secure resource of a user device.

15. The method of claim 11, further comprising, in response to determining that the match does not exist, denying, by the at least one configurable logic block of the plurality of configurable logic blocks, the user access to a secure resource.

16. The method of claim 10, further comprising hashing, by the at least one configurable logic block of the plurality of configurable logic blocks of the FPGA-based biometric sampling system, via a hash function, the enrollment biometric data sample to create hashed enrollment biometric data sample; and wherein causing, by the at least one configurable logic block of the plurality of configurable logic blocks of the FPGA-based biometric sampling system, the enrollment biometric data sample to be stored in the database comprises causing, by the at least one configurable logic block of the plurality of configurable logic blocks of the FPGA-based biometric sampling system, the hashed enrollment biometric data sample to be stored in the database.

17. The method of claim 10, wherein the biometric input data comprises a biometric input tensor.

18. The method of claim 10, wherein the biometric input data is provided by the user via a biometric sensor.

* * * * *